United States Patent
Kalama et al.

(10) Patent No.: US 10,722,805 B1
(45) Date of Patent: Jul. 28, 2020

(54) TECHNIQUES FOR CONCEALED VEHICLE RESET

(71) Applicant: Disney Enterprises, Inc., Burbank, CA (US)

(72) Inventors: Asa K. Kalama, Burbank, CA (US); Robert S. Trowbridge, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/421,117

(22) Filed: May 23, 2019

(51) Int. Cl.
  *A63G 4/00* (2006.01)
  *A63G 1/10* (2006.01)
  *G06F 3/16* (2006.01)

(52) U.S. Cl.
  CPC .......... *A63G 4/00* (2013.01); *A63G 1/10* (2013.01); *G06F 3/16* (2013.01)

(58) Field of Classification Search
  CPC ............. A63G 4/00; A63G 1/10; G06F 3/16
  USPC .................................................. 472/43, 60
  See application file for complete search history.

(56) References Cited

U.S. PATENT DOCUMENTS

| 5,403,238 A * | 4/1995 | Baxter | A63G 31/16 104/78 |
| 5,583,844 A * | 12/1996 | Wolf | A63G 31/16 472/43 |
| 6,220,171 B1 * | 4/2001 | Hettema | A63G 7/00 104/53 |
| 2010/0173717 A1 * | 7/2010 | Yule | A63G 21/18 472/128 |
| 2015/0190726 A1 * | 7/2015 | Frolov | A63F 13/837 472/61 |

* cited by examiner

*Primary Examiner* — Michael D Dennis
(74) *Attorney, Agent, or Firm* — Kilpatrick Townsend & Stockton LLP (57) ABSTRACT

Embodiments disclosed herein include an amusement park ride. The amusement park ride include a ride vehicle that can transition from a first configuration to a second configuration during the duration of the ride. The amusement park ride can include a loading area for loading passengers into the ride vehicle and a separate unloading area for disembarking passengers from the ride vehicle. After disembarking passengers from the ride vehicle the ride vehicle travels to a transition area concealed from the public where the ride transitions from the second configuration to the first configuration. In the transition area, maintenance can be performed on the ride vehicle and calibration can be performed on one or more of the ride vehicle systems (e.g., projector or audio systems).

6 Claims, 6 Drawing Sheets

TECHNIQUES FOR CONCEALED VEHICLE RESET

FIELD

The present disclosure relates generally to rides, in particular amusement park rides.

BACKGROUND

Amusement park rides or simply "rides" have been around for more than a century and have been used to entertain millions of visitors to amusement parks, theme parks, carnivals, and fairs, typically by moving one or more riders in each vehicle along a track. For example, roller coasters move passengers rapidly along a track while some theme rides may include slow or show portions as well as fast or thrill portions. Park operators are continually searching for new ride designs to enhance the passenger's experience and to encourage repeated use of a ride, i.e., looking for something that makes the ride different or unique enough each time that a park visitor will take a ride many times.

Some amusement park rides can implement special effects inside the show pod. Amusement park rides implement special effects inside a confined vehicle or show pod. The special effects need to be reset at the end of the ride. Some practical special effects needs to remain in place until after the passengers have exited the vehicle or pod. The vehicle or show pod also requires routine maintenance such as audio and projector calibration that can be tested and/or reset to baseline values as well. Because the calibration is typically not possible to do, practical effects are not used inside a passenger compartment and calibration activities happen less frequently during downtime.

BRIEF SUMMARY

Certain embodiments are directed to vehicles, systems, and techniques for transforming one or more elements of a ride vehicle from a first configuration to a second configuration during the duration of the ride. Upon conclusion of the ride, the vehicles, system, and techniques can be capable of transforming the one or more elements from the second configuration to a first configuration such that the transformation is outside the view of the public. In this way the passengers do not see the practical special effects resetting prior to entering the ride vehicle preserving surprise experienced during the ride. In one aspect a vehicle for an amusement park ride includes a chassis with one or more seats secured to the chassis for one or more passengers; and one or more vehicle elements in a first configuration. The one or more vehicle elements can be configured to change from the first configuration to a second configuration following a first trigger during a duration of the amusement ride. A transition of the one or more vehicle elements from the second configuration to the first configuration can occur following a second trigger and the wherein transition is concealed from public view.

During the transition period from the second configuration to the first configuration, maintenance can be performed on the vehicle. One or more vehicle systems can also be calibrated during this time period. In some embodiments, the one or more vehicle systems comprises a projector system. In some embodiments, the one or more vehicle system comprises an audio system. In some embodiments, the one or more vehicle system comprises a video system.

In some embodiments, the transition from the second configuration to the first configuration occurs after a first load of the one or more passengers exits the vehicle and prior to a second load of the one or more passengers enters the vehicle. In some embodiments, the transition from the second configuration to the first configuration can occur during a transit of the vehicle from an unloading area to a loading area.

In some embodiments, the elements can include at least one of the following devices: a door handle, a side-view mirror, a headlamp, a taillight and a vehicle hood.

In another aspect, a ride system, can include a closed-loop track. The closed-loop track can include a loading area and an unloading area along the length of the closed-loop track. In some embodiments, the loading area is displaced from the unloading area. The ride system can also include a plurality of vehicles configured for traveling along a ride path defined by the closed-loop track. The track can include a transition area along the track located between the unloading area and the loading area. The transition area is concealed from passengers located in the loading area and the unloading area. In the transition area, one of the plurality of vehicles can transition from a first configuration to a second configuration in the transition area. Maintenance can be performed on the one or more vehicles in the transition area. Calibration can be performed on the one or more vehicles in the transition area.

In another aspect, a method includes transitioning one or more elements of a ride vehicle from a first configuration to a second configuration during a duration of a ride between a loading area and an unloading area. The transition of the one or more elements of the ride vehicle from the second configuration to the first configuration can occur in an area concealed from public view. Calibration can be performed on the one or more ride vehicle systems in an area during the transition from the second configuration to the first configuration. The ride vehicle systems can comprise a video system (e.g., a projector system) and an audio system. Maintenance can be performed on the ride vehicle during the transition from the second configuration to the first configuration. The one or more elements can comprise at least one of the following devices: a door handle, a side-view mirror, a headlamp, a taillight and a vehicle hood. The elements can comprise one of physical devices inside a passenger compartment.

A better understanding of the nature and advantages of embodiments of the present disclosure may be gained with reference to the following detailed description and the accompanying drawings.

DETAILED DESCRIPTION

Certain embodiments of the present disclosure relate to systems, devices, and techniques for concealed vehicle reset for amusement park rides.

Figure 1:
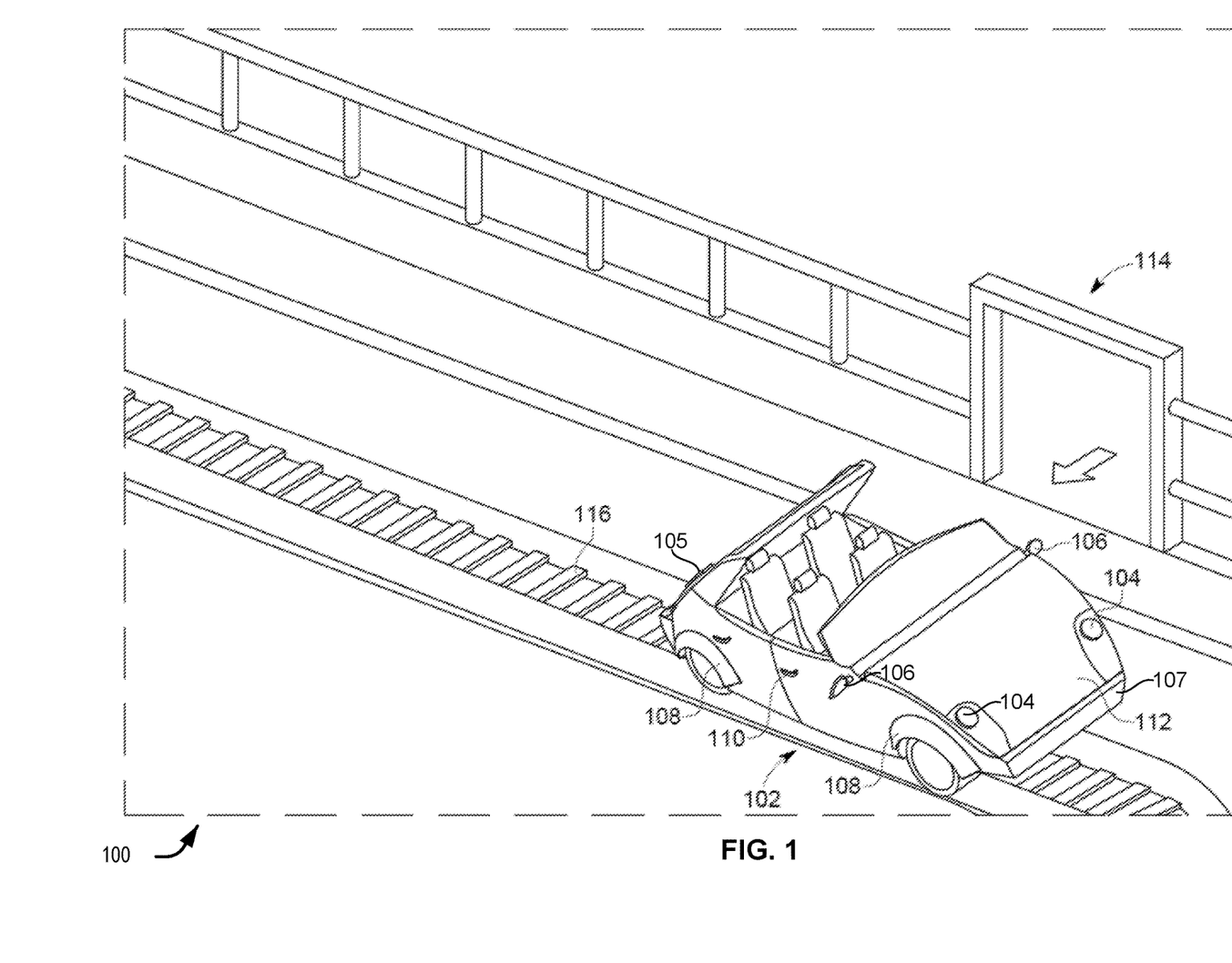
FIG. 1 illustrates an exemplary diagram of a loading area for an amusement park ride.

FIG. 1 illustrates an exemplary depiction of a loading area 100 for an amusement park ride. The loading area 100 can include one or more ride vehicles 102. In an exemplary depiction in FIG. 1, the ride vehicle 102 is depicted as an automobile having a chassis with one or more doors, four wheels, a windshield, a hood, a rear window. The ride vehicles are not limited to depicting automobiles but can take any form such as train cars, airplanes, submarines, spaceships or other amusement part forms. The chassis also can include one or more elements that are capable of changing during the duration of the ride. The elements can depend on the ride vehicle depiction such that automobile themed ride vehicles can have automobile themed elements. For example, a ride vehicle depicted as an automobile can have elements such as one or more headlights 104, one or more tail lights 105, one or more side view mirrors 106, and a bumper 107, one or more wheel fenders 108, and one or more door handles 110.

FIG. 1 illustrates all the features of the ride vehicle appearing in a first configuration, where the first configuration would appear to be a standard operational configuration. The ride vehicle elements can transition from a first configuration to a second configuration. A first configuration can be the configuration of the ride vehicle elements as the passengers are loading into the ride vehicle. A second configuration can be a different orientation, or position, or state of the element that differs from the first configuration. The transition of the one or more elements can be synchronized with the other visual, auditory or haptic effects of the ride. For example, if visual effects such as video displayed during the ride shows an object virtually striking the side view mirror of the ride vehicle, special effects incorporated into the vehicle can cause the side view mirror to detach from the mount (first configuration) and hang off the side of the vehicle handing by wiring (second configuration).

In some embodiments, two or more elements may transition from the first configuration to a second configuration can occur simultaneously. For example, if the ride vehicle experiences a virtual crash, the virtual crash can cause one or more elements to transition from the first configuration to a second configuration due to the simulated crash. In some embodiments, a trigger may cause the one or more elements to transition from the first configuration to the second configuration. The trigger can include but is not limited to a position of the ride vehicle along the ride, a distinct point in time for a visual or auditory effect, an action of a passenger in the vehicle, or a random event that can occur during the duration of the ride. In some embodiments, the a second trigger can cause the ride vehicle to change from the second configuration to a third configuration. The second trigger can also cause the ride vehicle to change from the second configuration back to the first configuration.

The elements can employ one or more techniques to transition from a first configuration to a second configuration. The techniques can utilize electrical, mechanical, or magnetic devices. By way of example, an element can be held in place by a magnetic force. The a spring can be placed between the element and the vehicle mount. Once the magnetic force is removed from the mount for the element, the element can appear to spring off the mount due to the force of the spring. A thin capable can be attached to the element to retain the element on the vehicle. During the transition from the second configuration back to the first configuration an electrical motor can rotate a cam shaft causing the wire to wind on a spool and return the element to the first configuration, including compressing the spring, on the mount. The magnetic on the mount can energize causing the element to be retained on the mount.

FIG. 1 illustrates an entrance 114 to the ride. In some embodiments, the entrance 114 to the loading area 100 is at least partially enclosed. The partial enclosure of the loading area can obscure the one or more vehicles in the unloading area from passengers in the loading area. The entrance 114 area can comprises an opening in a bulkhead in which the loading area is concealed from riders in line and riders exiting the ride. Alternatively, in some embodiments the one or more vehicles can exist a concealed transition area prior to entering the loading area. The transitioned area can be concealed by walls, curtains, screens, or decorations for the ride. In some embodiments, other visual effects such as lights or darkness can be used to conceal the transition area from the passengers.

FIG. 1 illustrates the ride vehicle 102 on a track 116. Although the track 116 is illustrated a double rail track it can alternatively comprise a monorail, or an overhead rail. In some embodiments, the vehicle is autonomous and follows a programmed course thereby not requiring a track 116 at all. In some embodiments, one or more sensors can be incorporated into the track 116 to detect the position of the one or more ride vehicles along the course of the ride.

Figure 2:
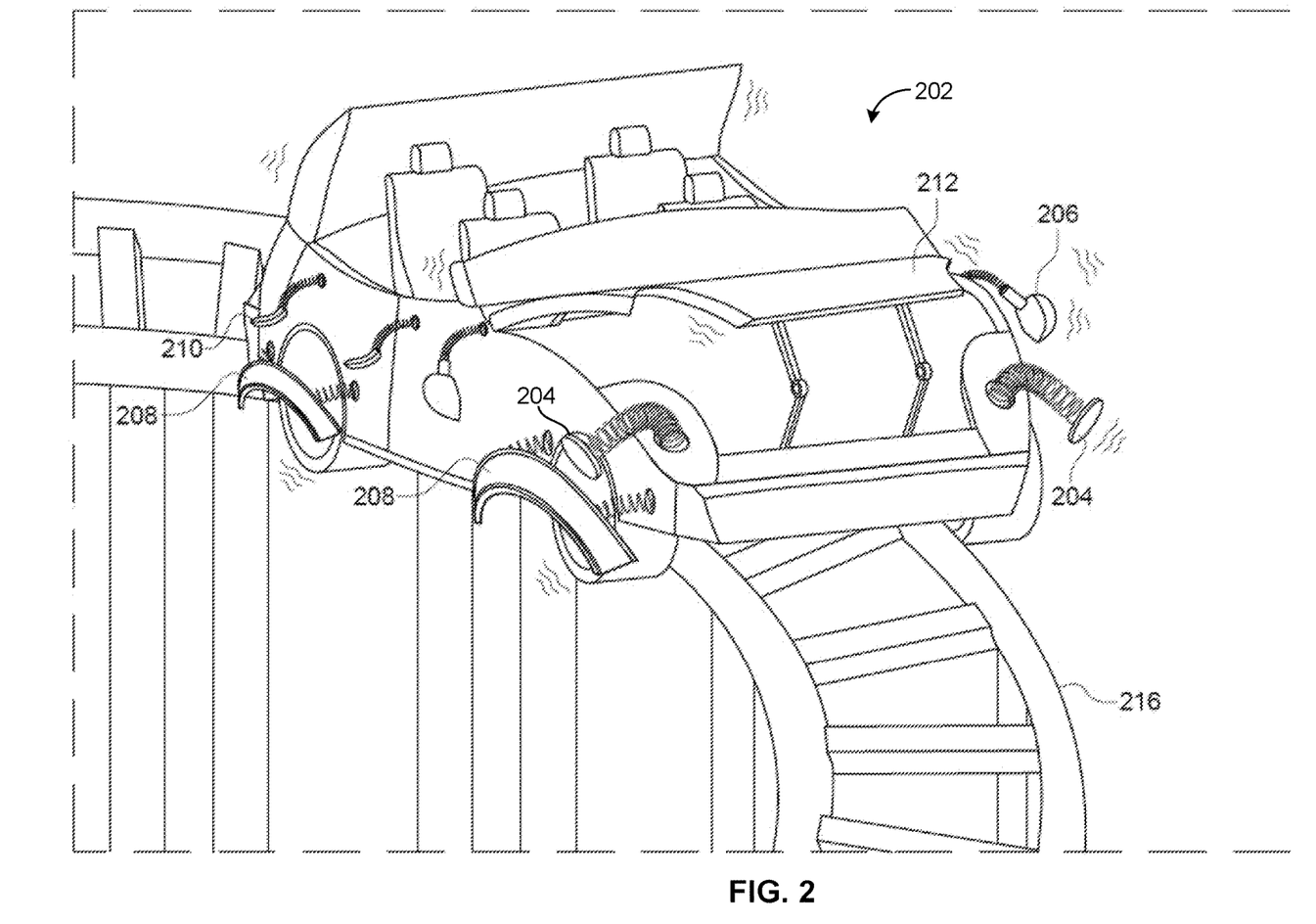
FIG. 2 illustrates an exemplary amusement ride vehicle during the ride.

FIG. 2 illustrates an ride vehicle 202 during the duration of the ride. The vehicle 202 is depicted as riding on the track 216. During the course of the ride one or more practical special effects can occur. Some of those practical special effects can cause one or more elements of the vehicle to transition from a first state to a second state. For example, FIG. 2 illustrates one or more headlights 204, one or more side view mirrors 206, one or more fenders 208, the one or more door handles 210, detached from the vehicle as the ride progresses. FIG. 2 also illustrates the vehicle hood 212 in the open position. The vehicle hood 212 opening can be timed to occur concurrently with events occurring during the ride. These practical special effects can be timed to coincide with events occurring outside the vehicle 202 or in a visual presentation on a screen or inside the vehicle or show pod.

Figure 3:
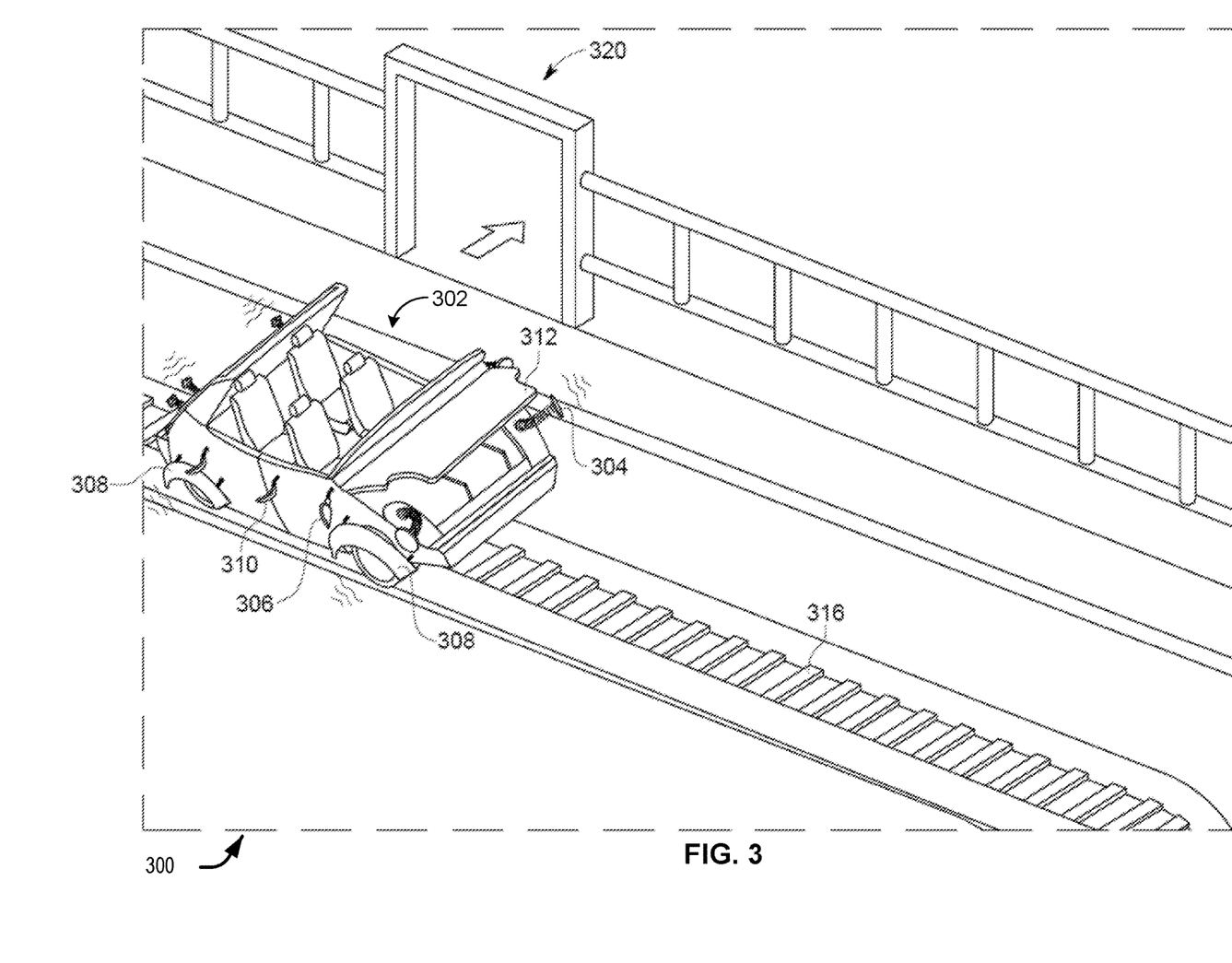
FIG. 3 illustrates an exemplary diagram of an unloading area for an amusement park ride.

FIG. 3 illustrates an unloading area 300 for an amusement park ride. FIG. 3 illustrates a ride vehicle 302 returning to an unloading area to offload the passengers. In some embodiments, the ride vehicle 302 can arrive at the unloading area in a second configuration, wherein one or more components of the ride vehicle changed during the duration of the ride due to one or more practical special effects occurred to the ride vehicle 302. For example, FIG. 3 illustrates the one or more headlights 304, the one or more side view mirrors 306, the one or more fenders 308, the one or more door handles 310, the one or more taillights are changed from the first configuration to a second configuration. The elements of the vehicle can remain in the second state until after the passengers exit the vehicle.

FIG. 3 illustrates an exit 320 from the unloading area through which one or more passengers can exit the vehicle and the unloading area. The entrance 114 can comprise an opening in a bulkhead in which the unloading area is concealed from riders in line and from ride. Alternatively, in some embodiments the one or more vehicles can exist the unloading area into a concealed transition area prior to entering the loading area. The transitioned area can be concealed by walls, curtains, screens, or decorations for the ride. In some embodiments, other visual effects such as lights or darkness can be used to conceal the transition area from the passengers in the unloading area.

Figure 4:
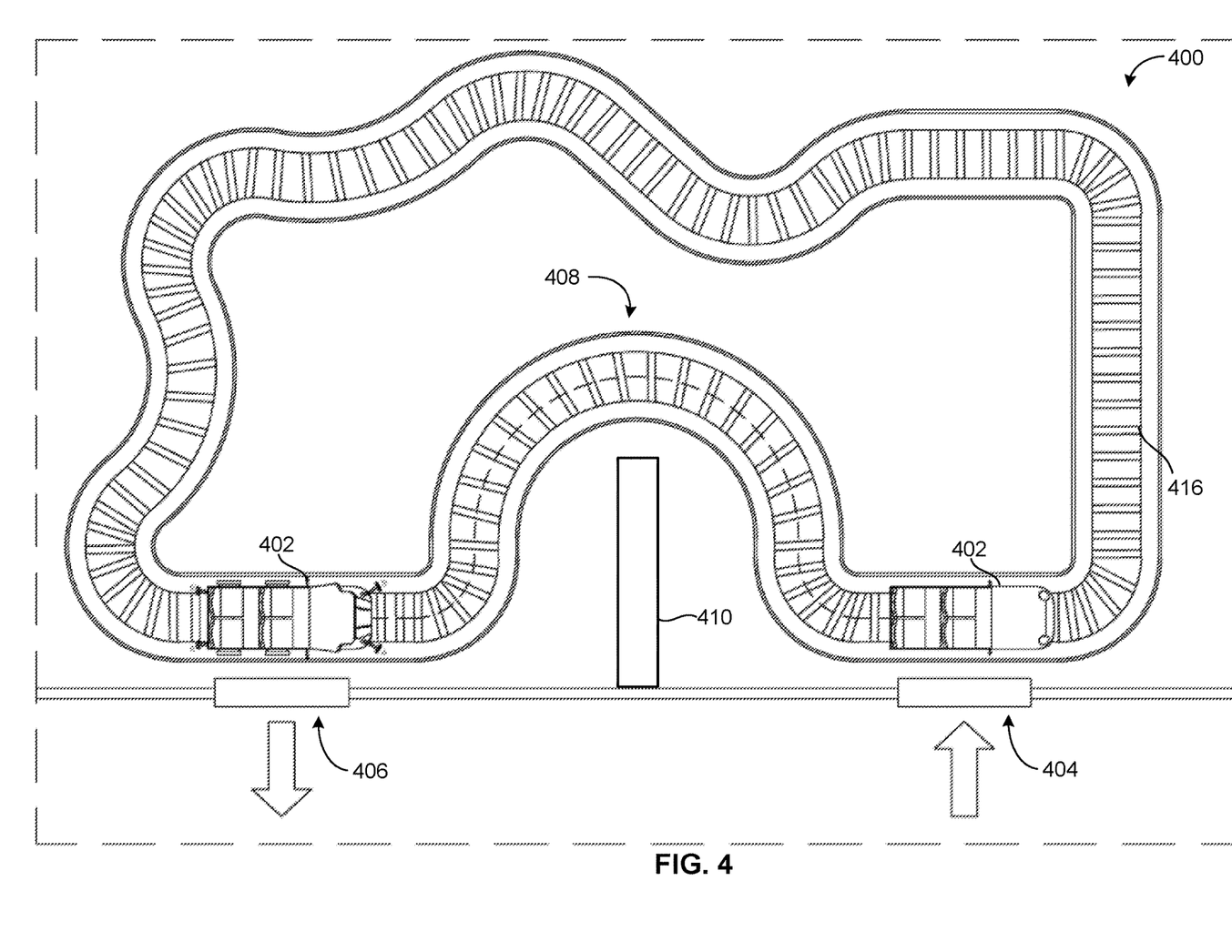
FIG. 4. illustrates an exemplary amusement park ride layout.

FIG. 4 illustrates a layout 400 for an amusement park ride. The layout 400 can comprise a track 416. In some embodiments, the track 416 can be closed loop. The track 416 can include one or more curves over which a ride vehicle 402 can travel. The layout 400 can comprise a loading area 404 for loading passengers into the one or more ride vehicles 402. An unloading area 406 allows for unloading passengers from the one or more ride vehicles 402. As depicted in FIG. 4, the loading area 404 is physically separated from the unloading area 406. During the course of the ride, one or more elements of the ride vehicle 402 can transition from a first configuration to a second configuration during the duration of the ride. FIG. 4 also illustrates a transition area 408. In some embodiments, the ride vehicle 402 can transition from the second configuration to the first configuration in the transition area 408. In some embodiments, a physical barrier 410 can conceal the ride vehicle during transition.

Figure 5:
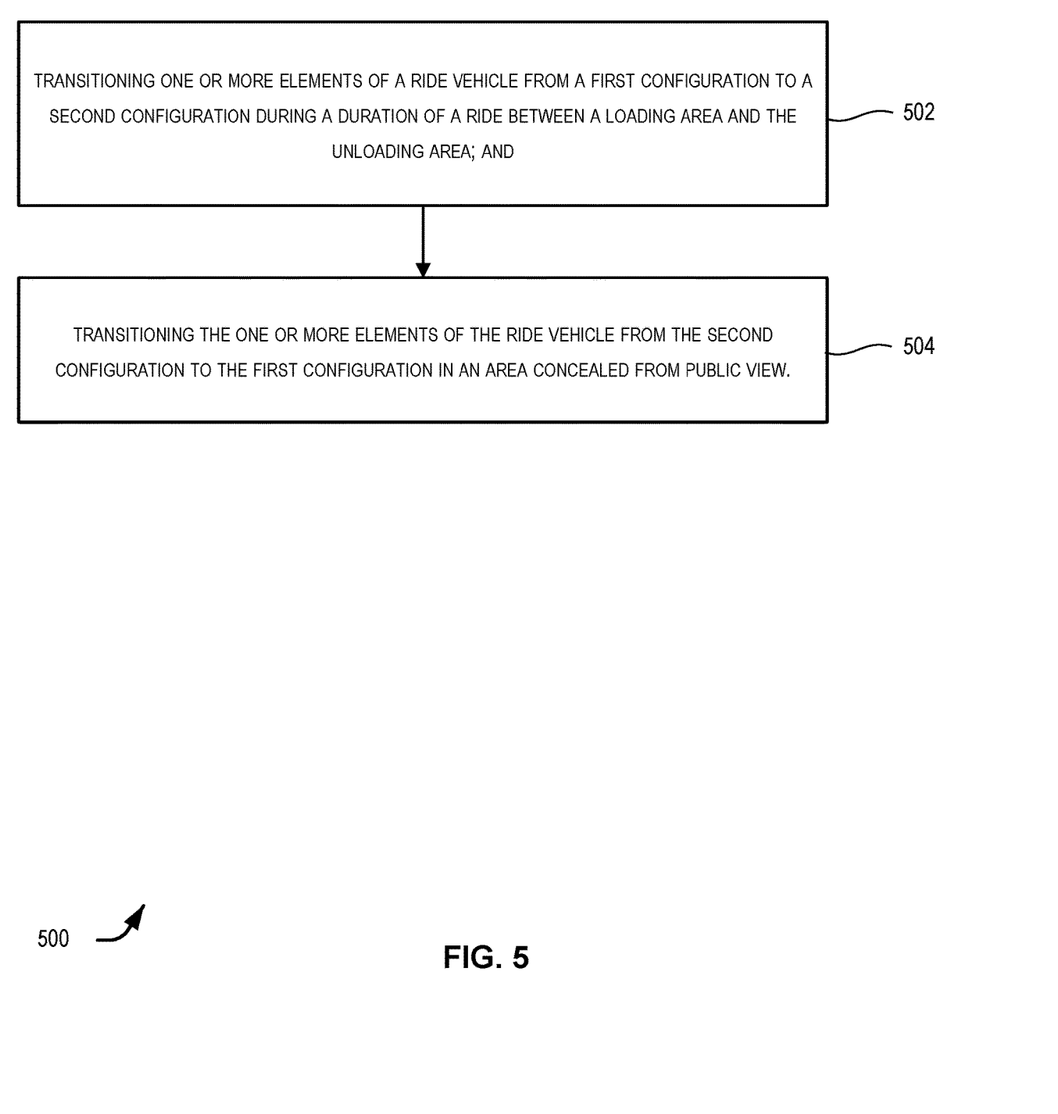
FIG. 5 illustrates a flow diagram for an exemplary method of covertly reconfiguring one or more ride vehicles.

FIG. 5 illustrates a flow diagram for an exemplary method 500 of covertly reconfiguring one or more ride vehicles. At 502, the technique includes transitioning one or more elements of a ride vehicle from a first configuration to a second configuration during a duration of a ride between a loading area and the unloading area. The ride vehicle elements can transition from a first configuration to a second configuration. A first configuration can be the configuration of the ride vehicle elements as the passengers are loading into the ride vehicle. A second configuration can be a different orientation, or position, or state of the element that differs from the first configuration. The transition of the one or more elements can be synchronized with the other visual, auditory or haptic effects of the ride. For example, if visual effects such as video displayed during the ride shows an object virtually striking the side view mirror of the ride vehicle, special effects incorporated into the vehicle can cause the side view mirror to detach from the mount (first configuration) and hang off the side of the vehicle handing by wiring (second configuration).

The one or more ride elements can employ one or more techniques to transition from a first configuration to a second configuration. The techniques can utilize electrical, mechanical, or magnetic devices. By way of example, an element can be held in place by a magnetic force. The a spring can be placed between the element and the vehicle mount. Once the magnetic force is removed from the mount for the element, the element can appear to spring off the mount due to the force of the spring. A thin capable can be attached to the element to retain the element on the vehicle.

At 504, the technique includes transitioning the one or more elements of the ride vehicle from the second configuration to the first configuration in an area concealed from public view. During the transition from the second configuration back to the first configuration an electrical motor can rotate a cam shaft causing the wire to wind on a spool and return the element to the first configuration, including compressing the spring, on the mount. The magnetic on the mount can energize causing the element to be retained on the mount.

The technique can include calibrating one or more ride vehicle systems during the transition from the second configuration to the first configuration. In some embodiments, the ride vehicle systems can include the accelerometers, position sensors, gyroscopes, pressure sensors, light sensors, and audio sensors. Sensors can be calibrated to achieve the best possible accuracy. Two important characteristics of sensors include precision, or the ability to produce the same output for the same input, and resolution, the ability to reliably detect small changes in the measured parameter. Noise and Hysteresis both affect the precision of sensors. All measurement systems are subject to random noise to some degree. Measurement systems with a low Signal to Noise Ratio will have problems making repeatable measurements. Hysteresis is the tendency of the sensor will tend to read low with an increasing signal and high with a decreasing signal as shown in the graph below. Hysteresis is a common problem with many pressure sensors.

Calibration is the method of adjusting the conversion process to produce more accurate measurements. A digital sensor can perform as a self-contained measurement subsystem. The amount of processing that is performed on the raw measurements varies depending on the sensor. Some sensors just digitize the data and report the raw electrical output. The raw data still need to be scaled and/or linearized by the one or more processors. More advanced sensors may scale or even linearize the data and report it in standard engineering units. Digital sensors can still be subject to manufacturing and operating condition variability. For critical measurements, calibration can be performed to the one or more sensors of the system.

In some embodiments, the ride vehicle systems comprises a projector system. Video images may be transmitted to displays through wired or wireless connections. In some embodiments one or more displays of the projector system can be calibrated during the transition period. Calibration is the comparison of an actual metric against a standard of known accuracy. For displays and monitors, the most important parameters to be calibrated are the brightness and the color settings. This means adjusting both the light output of the screen and the primary colors. For traditional stand-alone screens, including television sets at home, calibration is unnecessary because the colors and brightness will remain sufficient to provide an acceptable image quality. For professional displays however, calibration can be required. Also in video wall applications, perfect calibration is required as it impacts the viewing experience. Panels are calibrated in the factory. This means that the wall will normally look good upon installation. However, there are slight changes in color, brightness and contrast over time. This can be barely noticeable for stand-alone screens, but when the panels are located close to each other the slightest nuance in color and brightness shift may be clearly visible. This downplays the message the video wall wants to bring across. Without perfect calibration, the complete video wall may seem out of balance.

In some embodiments, the ride vehicle system comprises an audio system. An audio system can comprise microphones, headphones, video switchers, digital signal processors, audio controller, receivers, transmitters, amplifiers, loudspeakers, audio effects, mixing consoles, and microphones. Audio can be transmitted to loudspeakers via wired or wireless connections. Audio calibration can compensate for variations in equipment itself and environmental factors. Audio calibration can include balancing the one or more loudspeakers in the ride vehicle.

In various embodiments, maintenance is performed on the ride vehicle during the transition from the second configuration to the first configuration.

In various embodiments, the one or more elements comprise a part associated with the ride vehicle design. In some embodiments, the at least one of the following devices: a door handle, a side-view mirror, a headlamp, a taillight and a vehicle hood. In some embodiments, the elements can comprise one or more physical devices located inside a passenger compartment. For example, for ride vehicles that resemble an automobile, the internal devices can include one or more gauges (e.g., speedometer, temperature gauge), a steering wheel, a rear view mirror, etc.

It should be appreciated that the specific steps illustrated in FIG. 5 provide particular methods of rendering images using an immersion content system according to various embodiments of the present disclosure. Other sequences of steps may also be performed according to alternative embodiments. For example, alternative embodiments of the present disclosure may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented using one or more computer systems. Each step of these methods may be executed automatically by one or the one or more computer systems, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 6:
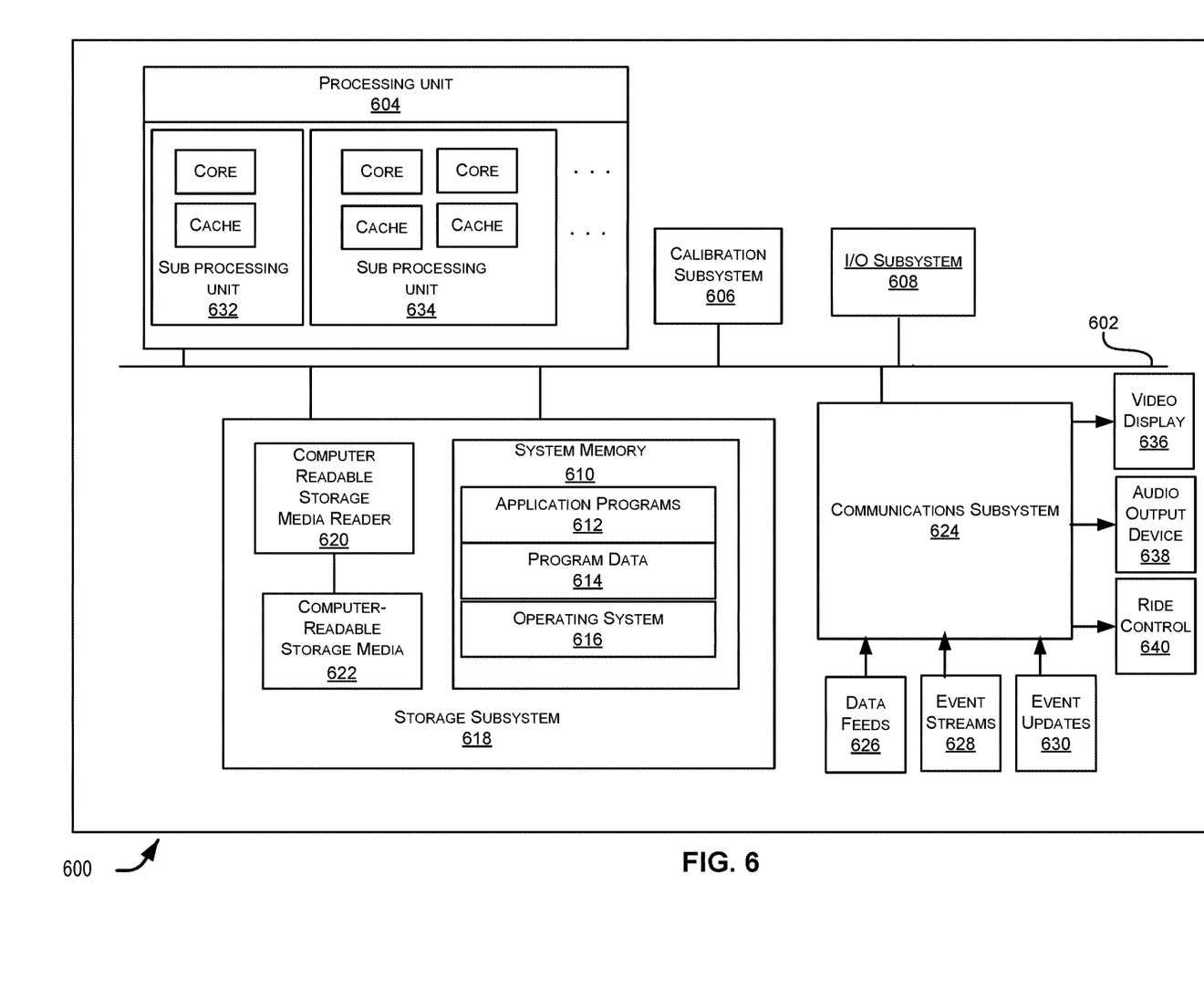
FIG. 6 illustrates a system diagram for a reconfigurable amusement park ride.

Each of the embodiments disclosed herein may be implemented using a special-purpose computer system. FIG. 6 illustrates a computer system 600, in which various embodiments described herein may be implemented. The system 600 may be used to implement any of the computer systems described above. As shown in the figure, computer system 600 includes a processing unit 604 that communicates with a number of peripheral subsystems via a bus subsystem 602. These peripheral subsystems may include a ride control system, a video system, an audio system, an input/output (I/O) subsystem 608, a storage subsystem 618 and a communications subsystem 624. Storage subsystem 618 includes tangible computer-readable storage media 622 and a system memory 610.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures.

Processing unit 604, which can be implemented as one or more integrated circuits (e.g., a conventional microprocessor or microcontroller), controls the operation of computer system 600. One or more processors may be included in processing unit 604. These processors may include single core or multicore processors. In certain embodiments, processing unit 604 may be implemented as one or more independent processing units 632 and/or sub processing unit 634 with single or multicore processors included in each processing unit. In other embodiments, processing unit 604 may also be implemented as a quad-core processing unit formed by integrating two dual-core processors into a single chip.

In various embodiments, processing unit 604 can execute a variety of programs in response to program code and can maintain multiple concurrently executing programs or processes. At any given time, some or all of the program code to be executed can be resident in processor(s) 604 and/or in storage subsystem 618. Through suitable programming, processor(s) 604 can provide various functionalities described above. Computer system 600 may additionally include a processing acceleration unit, which can include a digital signal processor (DSP), a special-purpose processor, and/or the like.

I/O subsystem 608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. The user interface input devices can be used to monitor the system, perform calibration through the calibration subsystem 606, and execute ride controls through the communications subsystem 624.

The system 600 can include one or more displays 636. The displays 636 can form one or more display walls as of the ride. In some embodiments, the displays 636 can be formed from multiple light emitting diode (LED) panels. In some embodiments, the displays 636 can be formed via multiple liquid crystal display (LCD) panels or thin-film transistor (TFT) liquid-crystal display (LCD) panels. In some embodiments, a ride can include one or more displays 636 inside the ride vehicle. One of more displays 636 can be projection displays presented outside the ride vehicle but at least partially viewable by the ride occupants. The displays 636 can present one or more images based on the theme of the ride.

The system 600 can include one or audio output devices 638. The audio output devices 638 can include one or more loudspeakers, or headphones. The audio output devices 638 can receive audio signals through the communications subsystem 624. The audio output devices 638 can provide instructions to the passengers and play sounds or music based on the theme of the ride.

The system 600 can include a ride control subsystem 640. The ride control subsystem 640 can provide one or more commands to electrical, mechanical, electro-mechanical, or magnetic actuators, motors, or controllers. The ride control subsystem 640 can provide commands to transition elements of a ride vehicle from a first configuration to a second configuration. The ride control subsystem 640 can transition elements of the ride vehicle from the second configuration to the first configuration. In various embodiments, one of the plurality of vehicles transitions from a first configuration to a second configuration in the transition area.

User interface output devices may also include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may comprise a storage subsystem 618 that comprises software elements, shown as being currently located within a system memory 610. System memory 610 may store program instructions that are loadable and executable on processing unit 604, as well as data generated during the execution of these programs.

Depending on the configuration and type of computer system 600, system memory 610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems.

Storage subsystem 618 may also provide a tangible computer-readable storage medium for storing the basic programming and data constructs that provide the functionality of some embodiments. Software (programs, code modules, instructions) that when executed by a processor provide the functionality described above may be stored in storage subsystem 618. These software modules or instructions may be executed by processing unit 604. Storage subsystem 618 may also provide a repository for storing data used in accordance with the present disclosure.

Storage subsystem 600 may also include a computer-readable storage media reader 620 that can further be connected to computer-readable storage media 622. Together and, optionally, in combination with system memory 610, computer-readable storage media 622 may comprehensively represent remote, local, fixed, and/or removable storage devices plus storage media for temporarily and/or more permanently containing, storing, transmitting, and retrieving computer-readable information.

Computer-readable storage media 622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable read only memory (EEPROM), flash memory or other memory technology, compact disk-read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600.

By way of example, computer-readable storage media 622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 624 can provide wired network connectivity (e.g., Ethernet) in addition to or instead of a wireless interface.

In some embodiments, communications subsystem 624 may also receive input communication in the form of structured and/or unstructured data feeds 626, event streams 628, event updates 630, and the like on behalf of one or more users who may use computer system 600. The communication subsystem 624 can communicate signals to one or more video displays 636, one or more audio output devices 638, or ride control subsystem 640.

Additionally, communications subsystem 624 may also be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to output the structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Google Glass® head mounted display), a PC, a workstation, a mainframe, a kiosk, a server rack, or any other data processing system.

Due to the ever-changing nature of computers and networks, the description of computer system 600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present disclosure. It will be apparent, however, to one skilled in the art that embodiments of the present disclosure may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the disclosure as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, erasable programmable read-only memory (EPROMs), EEPROMs, magnetic or optical cards, flash memory, or other types of machine-readable mediums suitable for storing electronic instructions. Alternatively, the methods may be performed by a combination of hardware and software.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
    transitioning one or more elements of a ride vehicle from a first configuration to a second configuration during a duration of a ride along a closed loop track between a loading area and an unloading area, wherein the loading area is concealed from the unloading area;
    transitioning the one or more elements of the ride vehicle from the second configuration to the first configuration along the closed loop track between the unloading area and the loading area such that the transitioning is concealed from public view; and
    calibrating one or more ride vehicle systems during the transition from the second configuration to the first configuration.

2. The method of claim 1, wherein the ride vehicle systems comprises a projector system.

3. The method of claim 1, wherein the ride vehicle systems comprises an audio system.

4. The method of claim 1, wherein the one or more elements comprise at least one of: a door handle and a side-view mirror.

5. The method of claim 1, wherein the elements comprise at least one of: a headlamp, a taillight and a vehicle hood.

6. The method of claim 1, wherein the elements comprise one of a plurality of physical devices inside a passenger compartment.

* * * * *